United States Patent [19]

Anderson et al.

[11] Patent Number: 4,773,020
[45] Date of Patent: Sep. 20, 1988

[54] SYSTEM FOR LOCKING OBJECTS

[76] Inventors: Carl A. Anderson, Engelbrektsgatan 6, Gavle, Sweden, 80354; Bela Farkas, Smaragdvagen 100; Anders S. Remar, Topasvagen 3E, both of, Gavle, Sweden, 80241

[21] Appl. No.: 927,811

[22] Filed: Nov. 6, 1986

Related U.S. Application Data

[63] Continuation-in-part of Ser. No. 839,451, Mar. 11, 1986, abandoned, which is a continuation of Ser. No. 462,090, Jan. 28, 1983, abandoned.

[30] Foreign Application Priority Data

Feb. 4, 1982 [SE]  Sweden ............................ 8200636

[51] Int. Cl.[4] ............... G07F 17/24; G06F 15/22; G07C 1/30
[52] U.S. Cl. ................. 364/464.01; 194/900; 235/130 R; 235/378; 340/51
[58] Field of Search ............ 364/464, 467, 569; 235/29 R, 30 A, 49, 66, 130 R, 377, 378, 382.5; 194/215, 220, 227, 230, 247, 900, 901, 902; 70/235, 277, 280; 340/51

[56] References Cited

U.S. PATENT DOCUMENTS

| Re. 29,259 | 6/1977 | Sabsay | 235/382.5 |
|---|---|---|---|
| 3,660,729 | 5/1972 | James et al. | 70/277 |
| 3,757,916 | 9/1973 | Selby | 194/900 |
| 3,831,408 | 8/1974 | Featherman | 70/264 |
| 3,877,266 | 4/1975 | McLaughlin | 70/280 |
| 3,906,447 | 9/1975 | Crafton | 235/382.5 |
| 3,917,046 | 11/1975 | Yorisue et al. | 194/220 |
| 3,948,375 | 4/1976 | Selby, Jr. | 340/51 |
| 3,952,850 | 4/1976 | Andersson et al. | 340/51 |
| 4,228,519 | 10/1980 | Pfeifer | 340/51 |
| 4,283,710 | 8/1981 | Genest | 235/382.5 |
| 4,379,334 | 4/1983 | Feagins, Jr. et al. | 364/467 |
| 4,433,787 | 2/1984 | Cook et al. | 70/235 |

FOREIGN PATENT DOCUMENTS 1478737  7/1977  United Kingdom ............... 364/464

Primary Examiner—Felix D. Gruber
Attorney, Agent, or Firm—Merchant, Gould, Smith, Edell, Welter & Schmidt

[57] ABSTRACT

A system for locking objects for a predetermined time on the basis of prepayment. A central processing unit (1) is connected to a plurality of object-locking devices (27) which may be locked after prepayment has been made into said unit. During count-down of the unit (1) to zero the object-locking devices can be unlocked for access, but only once. When the count-down continues below zero unlocking is prevented until additional payment has been made.

The System is particularly appropriate as a parking system for bicycles, a system for locking washing machines in laundromats, and a system for lockers at bus and railroad stations and at airports.

6 Claims, 2 Drawing Sheets

SYSTEM FOR LOCKING OBJECTS

BACKGROUND OF THE INVENTION

1. Field of the Invention

The present application is a continuation-in-part of application Ser. No. 839,451, filed Mar. 11, 1986; which is a continuation of application Ser. No. 462,090, Filed Jan. 28, 1983 both now abandoned.

This invention refers to a system for locking objects for a predetermined time on the basis of prepayment. The system may to advantage be used as a parking system for bicycles and will be exemplified as such, but it can equally well be utilized in other connections, for example for washing machines in laundromats and for lockers at bus and railroad stations and at airports.

2. Description of the Prior Art

Parking systems for bicycles become successively more justified in consequence of the increasing cost of fuel for automobiles and people beginning to use the bicycle as a means of transportation to a greater extent.

As the result of the increase in bicycle riding it is necessary that bicycle parking lots be orderly so that people may be able to find their bicycles after leaving them there. Furthermore, present-day bicycles are very expensive, and to a high degree this justifies securing them so that a bicycle owner may find his bicycle where he left it when he comes to pick it up.

Hitherto, the common mode of locking bicycles has been by means of either a lock which the owner carries with him or a lock which is mounted to the bicycle frame and has a component that protrudes through a wheel when the lock is engaged. In both of these cases there is the disadvantage that a thief may carry the entire bicycle away.

SUMMARY OF THE INVENTION

As an example, the present invention will be described in terms of a parking system which may be utilized for conventional bicycles and/or motorcycles and if desired also, for instance, for automobiles, the system enabling the relevant vehicles to be secured in place for a period of time for which prepayment is made, with the possibility of additional payment being made to release the vehicle if the owner returns after the value of the prepayment has been exceeded.

However, the system can find many other uses, for example in laundromats and in lockers at bus and train stations as well as at airports. Basically the principle discussed below may be used in such cases, and hence the invention is in no way restricted to use in connection with bicycles.

Specific features of the invention are defined in the accompanying claims.

BRIEF DESCRIPTION OF THE DRAWINGS

The invention will be described more specifically with reference to the accompanying drawings in which.

DESCRIPTION OF THE PREFERRED EMBODIMENT

Basically, the parking system which is utilized as an example of the invention comprises a central processing unit and a number of locks at places where locking can be carried out to secure bicycles to bicycle stands which may be utilized by customers if they pay a fee. Each bicycle stand position may be locked individually, and the lock 27 itself can for instance be a lock which may be unlocked manually be means of a key, or otherwise. It can for example be an electric lock which may be unlocked by means of a code, with the lock in both cases being controlled by the central processing unit. An arbitrary number of bicycle stand positions may be connected to the central processing unit.

Figure 1:
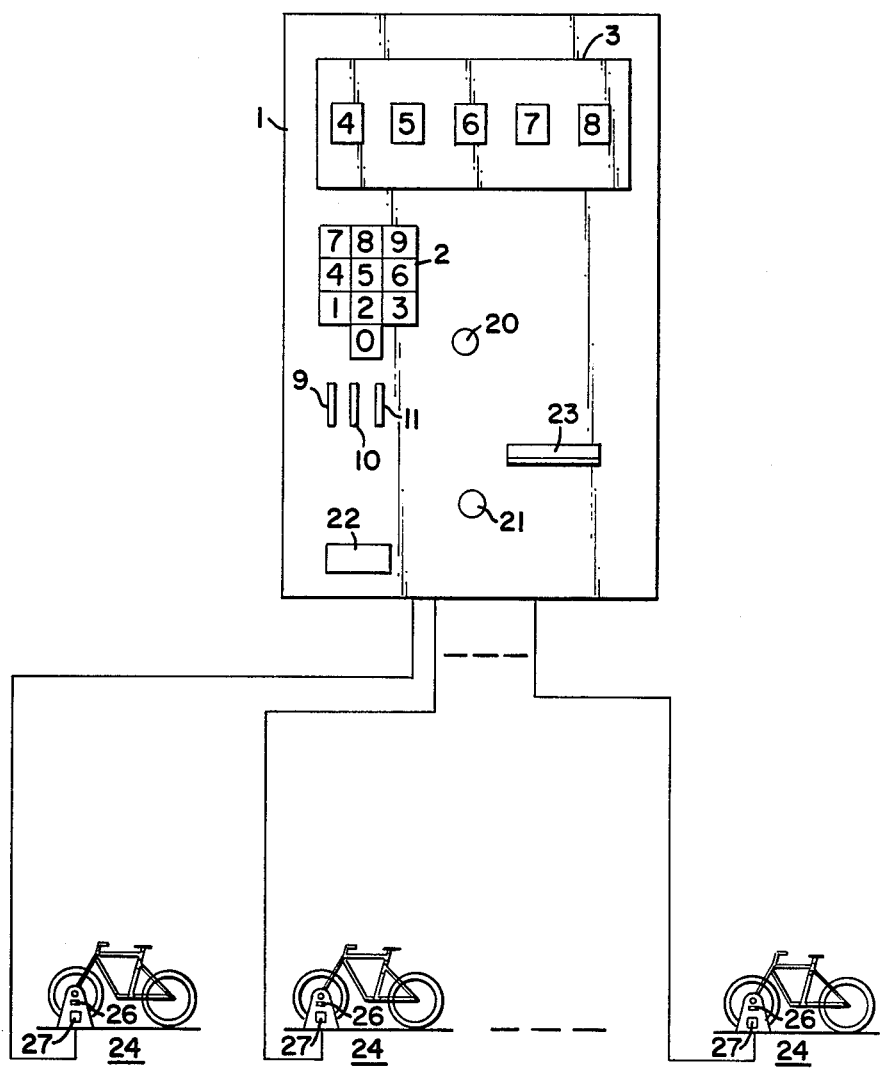
FIG. 1 diagrammatically shows a front view of a central processing unit which is incorporated in a parking system with bicycle stand connected to said unit.

An example of the front of the central processing unit 1 is shown in FIG. 1. In the figure there may be seen a keyset 2 for introducing the place number of the bicycle stand, a display 3 with five windows for showing the place number (window 4), week (window 5), day of the week (window 6), the hour (window 7) and the minute (window 8). Windows 7 and 8, for displaying the hour and the minute, may alternatively be used for displaying a specific amount of money in the event that the originally purchased parking time has expired and additional time must be purchased in order for the lock to be unlocked. This will be disclosed more in detail below.

Furthermore, the central processing unit includes means for accepting payment. In the illustrated case these means include three coin slots 9, 10 and 11, which, if desired, may be replaced by, for instance, bank note readers or card readers, as for example, for credit cards. In the illustrated embodiment the central processing unit is provided with a start button 20, a change-of-mind button 21, an aperture 22 for delivering returned coins when, for instance, a person intending to park his bicycle has changed his mind and presses the change-of-mind button, and a receipt dispensing aperture 23 which forms an outlet for a receipt printer if such is included.

FIG. 1 diagrammatically shows three lockable bicycle stands 24 connected by leads to the central processing unit. In reality an arbitrary number of bicycle stands may be connected.

Figure 2:
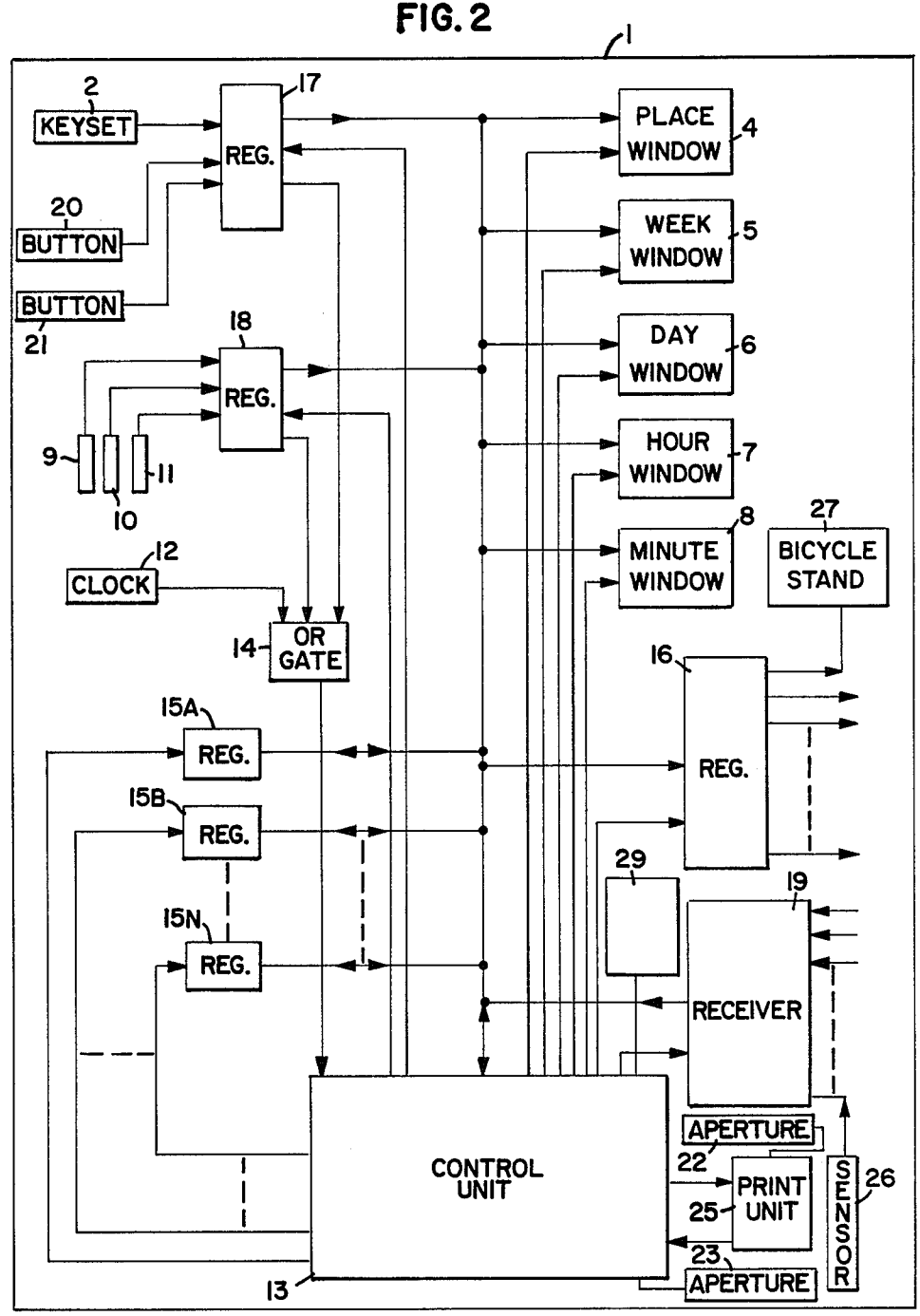
FIG. 2 shows a block diagram covering the main components of the central processing unit.

FIG. 2 shows the inside of the central processing unit 1 diagrammatically, which in addition to the components mentioned above includes a clock 12 connected to a control unit 13 via an OR gate 14, place registers 15A, 15B . . . 15N corresponding to the number of bicycle stand places 24, a register 16 connected to the control unit 13 and to each individual bicycle stand place 24 for determining whether it should be possible to open a lock or not on the basis of information derived from the place registers 15A–15N indicating whether the place 24 is paid for or not, and a circuit 19 for connecting individual sensors 26, which are located at each bicycle stand place 24, to the central processing unit.

The keyset 2 is connected to a register 17 cooperating therewith, and the three coin slots 9–11 are connected to a register 18. On their outlet sides registers 17 and 18 are connected to the mentioned OR gate 14 and can thus be connected to the control unit 13. To the latter is also connected a code printing unit 25 for the event that the bicycle stands are to be provided with electric locks.

The central processing unit operates in the following manner:

When the central processing unit is in its quiescent position display 3 shows week, day, hour and minute (present time) in the respective windows 5-8. This is controlled by the clock 12 which feeds a pulse to control unit 13 over OR gate 14 for example once a minute, whereafter control unit 13 provides the corresponding information for the display windows 5-8.

When a person wishes to park his bicycle he puts it at a numbered bicycle stand place, keeps the number of the place in mind, and goes to the central processing unit in which he presses buttons in the keyset 2 giving the number of the place. This number is then shown in display window 4. Thereafter the relevant person drops coins corresponding to the desired parking time into one or more of the slots 9-11 which are intended for receiving coins of different values. In the central processing unit the control unit 3 will calculate, on the basis of register 18 being actuated when a coin is dropped into one or more of the coin slots 9-11, how long time the bicycle may stay parked for the amount dropped into the slot. Information concerning this time is provided to the place register, for example 15A, and is fed out further so as to reach display windows 5-8 which indicate the time (week, day, hour, minute) when the purchased time ceases.

Basically, it is possible to distinguish between two types of central processing units, namely one which includes the start button 20 and the change-of-mind button 21 and another which lacks these two buttons and their associated functions.

If the central processing unit is of the type which is equipped with a start button and a change-of-mind button it is necessary to initiate the sequence after coins have been introduced into the relevant coin slots by depressing start button 20. This leads to a signal being supplied from start button 20 via a lead to register 17 and OR gate 14 and via a lead to control unit 13 which, via register 16 for lock control, accomplishes locking if the lock is mechanical, or enables electric locking via code printing unit 25, respectively. If the central processing unit is of the mentioned type which is provided with a start button and a change-of-mind button display windows 5-8 will display the final moment of the purchased time continuously for each coin that is dropped into the coin slots. This display ceases when the start button is depressed.

In the alternative case when the central processing unit lacks a start button there is not a change-of-mind button.

In this case the introduction of coins is utilized per se for controlling the initiation of the purchase of time. When this is carried out continuous display of week and day is effected in display windows 5 and 6 and of hour and minute in display windows 7 and 8. The locking function is released in consequence of the first coin being introduced in contrast to the case with a start button when the locking function is released as the result of the start button being depressed. In the case when there is no start button and the relevant person has introduced a coin and hence has been provided with an indication in display windows 5-8 this indication is retained for a predetermined time, whereafter time disconnection is carried out unless the next person depresses the buttons for his parking place. Said indication also disappears in the last-mentioned case.

According to the above, locking can be carried out either mechanically or electrically.

In mechanical locking the relevant person can perform the locking function as soon as the start button has been depressed, if the central processing unit is provided with such button, or as soon as coin deposit has occurred, in the case where there is not start button, i.e., it becomes possible to turn the key so as to carry out locking and in doing so to remove the key or to introduce the key once later on and turn it for unlocking if the prepaid time has not yet lapsed.

Electric locking is carried out automatically by the cooperation of the central processing unit 13, with a receipt being simultaneously fed through the aperture 23 from the code printing unit 25. This receipt contains information about a code which is selected by random number generator 28 and which hence cannot be predetermined. When the relevant person wishes to pick up his bicycle he simply presses this code into keyset 2, thereby effecting unlocking. The code may be in the form of a combination of digits or letters. Instead of having the receipt indicate the number of the parking space as selected by the customer (who has indicated his selection by pressing the appropriate buttons of keyset 2), the printed information on the receipt can contain the number of the parking space to be occupied by the customer on the basis of a signal from sensors 26 sent to the control unit 13, indicating the availability of unoccupied parking spaces. This parking space number can be shown on the display 3 as well. The printout can also contain information on when the purchased time expires, and on the amount of money already paid as shown by the display windows 4-8.

The place register 15A stores information which it via control unit 13 obtains about the moment up to which time has been purchased. Clock 12 continuously delivers pulses to control unit 13, for example one pulse per minute. Upon receipt of each said pulse control unit 13 investigates the contents of the respective place registers 15A-15N.

Thus, if the person who wishes to pick up his bicycle returns before the purchased time has lapsed, he can immediately release the bicycle either by introducing the key into the lock and turning it, if the locking has been carried out mechanically, or by pressing the code given on the receipt into keyset 2 if the locking has been carried out electrically.

The central processing unit has to be told that the bicycle has been released so that it does not consider the bicycle stand place as still occupied and locked. Therefore each bicycle stand place is equipped with a sensor, and when the bicycle stand becomes unlocked a signal from said sensor is emitted continuously to a receiver 19 for sensor signals. Control unit 13 senses receiver 19 for example once each minute, and if a signal is supplied to any of the incoming leads a corresponding marking is made in the place register for indicating that the bicycle stand is available. Hereby it is possible to avoid the central unit having the impression that the bicycle stand is locked up to the moment when the purchased time has passed which is not the case if the relevant person has taken his bicycle earlier.

When the contents of the place registers 15A-15N become equal to present time, i.e., the count-down is zero, control unit 13 delivers a pulse via register 16 for lock control to that lock in the bicycle stand which corresponds to the relevant place register if the locking is mechanical. If the locking is electrical a corresponding marking is given in the place register. Hereby the locks become mechanically or electrically locked in any suitable, well known manner. When a person comes to pick up his bicycle and the purchased time thus has been consumed he cannot under such conditions open the lock and will instead have to go to the central processing unit 1 and press the number of his bicycle stand place on the keyset 2 again, whereafter display windows 7 and 8 show the amount which he has to drop into the coin slots for control unit 13 to deliver a signal for releasing the bicycle, which will occur after he has entered his secret code number.

The invention is not restricted to the embodiment mentioned above nor to the utilization mentioned above, and these only comprise examples of the invention and of its mode of operation. Thus, it can basically be utilized in parking placed for motorcycles, and, possibly in modified form, for automobiles. The described system may also include means 29 connected to the control unit for enabling an authorized person to unlock a lock via a main key or via a specific function of the central processing unit, for example by introducing a predetermined code into keyset 2.

We claim:

1. A parking system for bicycles, said system comprising:
   (a) a plurality of bicycle stands; each bicycle stand including an arbitrary number of individual, numbered, lockable bicycle parking places;
   (b) sensor means; one of said sensor means being disposed in each of said individual bicycle parking places for sensing the presence of a bicycle;
   (c) locking means; one of said locking means being disposed in each of said individual bicycle parking places for locking a bicycle;
   (d) a control unit; said control unit being common to all of said bicycle stands;
   (e) receiver means; said receiver means being connected between said sensor means and said control unit for receiving sensing signals from said sensor means in said control unit;
   (f) register means; said register means being connected between said locking means and said control unit for sending locking and unlocking signals, respectively, from said control unit to said locking means;
   (g) printing means; said printing means being connected to said control unit for receiving control signals therefrom and for sending signals thereto;
   (h) payment receiving means; said payment receiving means being connected to said control unit for providing information on payment received for parking;
   (i) a random code generator; said random code generator generating a random, secret code and being connected to said control unit and said printing means;
   (j) a keyset for manual actuation; said keyset being connected to said control unit for supplying the keyed number of a bicycle place to the control unit in response to such keying;
   (k) clock means; said clock means being connected to said control unit for supplying clock pulse signals thereto;
   (l) start button means; said start button means being connected to said control unit;
   (m) a display; said display being connected to said control unit for receiving signals for displaying:
      (i) said keyed bicycle place number;
      (ii) the present time when the control unit is in a quiescent position;
      (iii) the outgoing time when payment for the keyed bicycle place number has been made to a payment receiving means; and
      (iv) the amount of money paid; and
   (n) a receipt dispenser; said receipt dispenser being connected to said printing means, said start button means initiating—after the place number of a selected bicycle place has been keyed on said keyset by the parker, after payment in said payment receiving means has been made, and after manual actuation of said start button means has been carried out by the parker—(A) locking of the bicycle and (B) printout on said receipt of: said selected, keyed bicycle place number, a randomly generated secret code number in the form of a combination of digits subsequently to be introduced manually by the parked on the keyset for releasing the locked bicycle, said displayed outgoing time, and said displayed amount of money paid.

2. A parking system in accordance with claim 1, wherein said display indicates the additional payment required once the initial parking period has been exceeded, said control unit thereby validating the originally generated secret unlocking code which may be utilized once when said additional payment has been received by said payment receiving means.

3. A parking system in accordance with claim 1, comprising means for releasing said locked bicycle by an authorized person by means of a specific function of said control unit.

4. A parking system for bicycles, said system comprising:
   (a) a plurality of bicycle stands; each bicycle stand including an arbitrary number of individual, numbered, lockable bicycle parking places;
   (b) sensor means; one of said sensor means being disposed in each of said individual bicycle parking places for sensing the presence of a bicycle;
   (c) locking means; one of said locking means being disposed in each of said individual bicycle parking places for locking a bicycle;
   (d) a control unit; said control unit being common to all of said bicycle stands;
   (e) receiver means; said receiver means being connected between said sensor means and said control unit for receiving sensing signals from said sensor means in said control unit;
   (f) register means; said register means being connected between said locking means and said control unit for sending locking and unlocking signals, respectively, from said control unit to said locking means;
   (g) printing means; said printing means being connected to said control unit for receiving control signals therefrom and for sending signals thereto;
   (h) payment receiving means; said payment receiving means being connected to said control unit for providing information on payment received for parking time thereto;
   (i) a random code generator; said random code generator generating a random, secret code and being connected to said control unit and said printing means;
   (j) a keyset for manual actuation; said keyset being connected to said control unit for supplying the keyed number of a bicycle place to the control unit in response to such keying;

(k) clock means; said clock means being connected to said control unit for supplying clock pulse signals thereto;
(l) start button means; said start button means being connected to said control unit;
(m) a display; said display being connected to said control unit for receiving signals for displaying:
  (i) said keyed bicycle place number;
  (ii) the present time when the control unit is in a quiescent position;
  (iii) the outgoing time when payment for the keyed bicycle place number has been made to said payment receiving means; and
  (iv) the amount of money paid; and
(n) a receipt dispenser; said receipt dispenser being connected to said printing means, said start button means initiating—after payment in said payment receiving means has been made and after manual actuation of said start button means has been carried out by the parker—(A) locking of the bicycle and (B) printout on said receipt of: an available bicycle place number telling the parker where to park his bicycle, a randomly generated secret code number in the form of a combination of digits subsequently to be introduced manually by the parker on the keyset for releasing the locked bicycle, said displayed outgoing time, and said displayed amount of money paid.

5. A parking system in accordance with claim 4, wherein said display indicates the additional payment required once the initial parking period has been exceeded, said control unit thereby validating the originally generated secret unlocking code which may be utilized once when said additional payment has been received by said payment receiving means.

6. A parking system in accordance with claim 4, comprising means for releasing said locked bicycle by an authorized person by means of a specific function of said control unit.

* * * * *